(12) United States Patent
Kim

(10) Patent No.: US 9,191,808 B2
(45) Date of Patent: Nov. 17, 2015

(54) METHOD, DEVICE AND SYSTEM FOR PROVIDING PRESENCE FUNCTION IN ENTERPRISE MOBILITY SYSTEM

(71) Applicant: Samsung Electronics Co., Ltd, Gyeonggi-do (KR)

(72) Inventor: Jong-Seok Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 217 days.

(21) Appl. No.: 13/767,701

(22) Filed: Feb. 14, 2013

(65) Prior Publication Data

US 2013/0223342 A1    Aug. 29, 2013

(30) Foreign Application Priority Data

Feb. 14, 2012  (KR) ........................ 10-2012-0014817

(51) Int. Cl.
| | |
|---|---|
| H04W 8/24 | (2009.01) |
| H04W 8/02 | (2009.01) |
| H04L 29/08 | (2006.01) |
| H04W 4/02 | (2009.01) |
| H04W 84/10 | (2009.01) |

(52) U.S. Cl.
CPC ................. *H04W 8/24* (2013.01); *H04L 67/24* (2013.01); *H04W 4/02* (2013.01); *H04W 8/02* (2013.01); *H04W 84/10* (2013.01)

(58) Field of Classification Search
USPC ............... 370/282, 299, 328, 449; 379/32.01, 379/32.04, 92.01, 93.01, 133–134, 201.02, 379/201.1, 220.01, 221.05, 224, 225, 229, 379/231, 232, 234
See application file for complete search history.

(56) References Cited

U.S. PATENT DOCUMENTS

| | | | |
|---|---|---|---|
| 2003/0069030 A1* | 4/2003 | Mukherjee .................... | 455/461 |
| 2004/0043774 A1* | 3/2004 | Lee ............................. | 455/456.1 |
| 2005/0113134 A1* | 5/2005 | Bushnell et al. ............. | 455/555 |
| 2006/0036773 A1* | 2/2006 | Syrtsov et al. ............... | 709/250 |
| 2007/0118604 A1* | 5/2007 | Costa Requena ............ | 709/206 |
| 2010/0014494 A1* | 1/2010 | Schmidt et al. .............. | 370/338 |
| 2011/0026517 A1* | 2/2011 | Capuozzo et al. ........... | 370/352 |
| 2011/0126109 A1* | 5/2011 | Fish .............................. | 715/735 |
| 2011/0185006 A1* | 7/2011 | Raghav et al. ............... | 709/201 |
| 2013/0223342 A1* | 8/2013 | Kim .............................. | 370/328 |

\* cited by examiner

*Primary Examiner* — Benjamin H Elliott, IV

(57) ABSTRACT

A method for operating a terminal to provide a presence function in an Enterprise Mobility System (EMS) includes transmitting a registration message a server; receiving a response message including state information of a user group from the server in response to the registration message; and displaying the state information of the user group. The state information is information which is provided to the server from at least one network entity of a plurality of network entities included in the enterprise mobility system and is collected.

26 Claims, 12 Drawing Sheets

METHOD, DEVICE AND SYSTEM FOR PROVIDING PRESENCE FUNCTION IN ENTERPRISE MOBILITY SYSTEM

CROSS-REFERENCE TO RELATED APPLICATION(S) AND CLAIM OF PRIORITY

The present application is related to and claims priority under 35 U.S.C. §119 to an application filed in the Korean Intellectual Property Office on Feb. 14, 2012 and assigned Serial No. 10-2012-0014817, the contents of which are incorporated herein by reference.

TECHNICAL FIELD

The present disclosure relates generally to an Enterprise Mobility System (EMS) and in particular, to a method, device and system for providing a presence function.

BACKGROUND

An enterprise has employed an enterprise mobility system (EMS) because the EMS enables the enterprise to become a Real Time Enterprise (RTE) which decreases costs related to communication and respective communications, improves operational efficiency and processes all tasks in real time basically. The EMS is a system for allowing an enterprise to process tasks in real time at any time, and anywhere using mobile devices, mobile solutions, network communication networks or the like. In particular, a voice call service has been used using an Internet Protocol Private Branch eXchange (IP PBX).

On the other hand, the IP PBX uses an Add On Module (AOM). Various functions requested by a user, such as a Direct Station Select (DSS) function or a Busy Lamp Field (BLF) function, may be assigned to respective key buttons of the AOM and be used. The DSS function is a function for allowing a user to perform a call-forward to any extension by selecting one key, and the BLF function is a function for allowing a user to check the state of extensions that are busy using LEDs. For example, when an LED is turned off, a corresponding extension is in an idle state, and when an LED is flickering, or when the LED is turned on while ringing occurs, a corresponding extension is busy. Also, a user performs functions, such as a call transfer function, a call pick up function, call dialing or the like, using the AOM.

Also, the user may login to the EMS and indicate the user's own state in absence, busy, idle states or the like and use a presence function for enabling group users which are registered in real time to check the states thereof.

However, in prior art, when the IP PBX functions are applied to a smart phone, the states of group users (that is, the state information (for example, busy, incoming, idle or the like) of a terminal provided by the AOM) are continuously provided, battery consumption may increase. Further, the call states of the group users are only displayed, so that it is impossible to know the call states of other users besides the group users.

On the other hand, if the presence function is provided based on an existing server/client model, the state of a user is updated in real time and the user's presence is displayed on a background screen when the state of the user is changed, thus increasing battery consumption and, also, causing a user to update the user's own state.

SUMMARY

To address the above-discussed deficiencies of the prior art, it is a primary object to provide a method, device and system for providing a presence function in an enterprise mobility system.

Another object of the present disclosure is to provide a method, device and system for emerging an Internet phone function to a smart phone in an enterprise mobility system.

Another object of the present disclosure is to provide a method, device and system for decreasing battery consumption generated by emerging an Internet phone function to a smart phone in an enterprise mobility system.

According to a first aspect of the present disclosure, a method for operating a terminal to provide a presence function an Enterprise Mobility System (EMS) includes: transmitting a registration message a server; receiving a response message including state information of a user group from the server in response to the registration message; and displaying the state information of the user group, wherein the state information is information which is provided to the server from at least one network entity of a plurality of network entities included in the enterprise mobility system and is collected.

According to a second aspect of the present disclosure, a method for operating a server to provide a presence function in an Enterprise Mobility System (EMS) includes: receiving state information of a user group of a terminal from at least one network entity of a plurality of network entities included in the enterprise mobility system; determining the state information of the user group of the terminal; and when receiving a registration message from the terminal, transmitting a response message including the state information of the user group of the terminal to the terminal.

According to a third aspect of the present disclosure, an electronic device includes: at least one processor; a memory; and at least one program stored in the memory and configured to be executed by the at least one processor, wherein the program transmits a registration message a server; receives a response message including state information of a user group from the server in response to the registration message; and displays the state information of the user group, and wherein the state information is information which is provided to the server from at least one network entity of a plurality of network entities included in the enterprise mobility system and is collected.

According to a fourth aspect of the present disclosure, an electronic device includes: at least one processor; a memory; and at least one program stored in the memory and configured to be executed by the at least one processor, wherein the program receives state information of a user group of a terminal from at least one network entity of a plurality of network entities included in the enterprise mobility system; determines the state information of the user group of the terminal; and when receiving a registration message from the terminal, transmits a response message including the state information of the user group of the terminal to the terminal.

According to a fifth aspect of the present disclosure, an Enterprise Mobility System (EMS) for providing a presence function includes: a server for transmitting the image including at least one of the measurement result and identification label of the measuring device to an information system, receiving information about at least one of the measurement result and identification label of the measuring device from the information system, and displaying the information about at least one of the measurement result and identification label of the measuring device; and a terminal for displaying the state information of the user group received from the server.

According to a sixth aspect of the present disclosure, a method for operating a second terminal includes: when a call transfer event occurs during call connection to a first terminal, displaying pre-registered user information of a second terminal and state information of respective users; and when a specific user is selected from the user information, transferring the call connected to the first terminal to a third terminal of the specific user, wherein the state information is one of idle, absence/logout, busy, conference, and incoming states.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION

For a more complete understanding of the present disclosure and its advantages, reference is now made to the following description taken in conjunction with the accompanying drawings, in which like reference numerals represent like parts:

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure relates to a method, device and system for providing a presence function in an Enterprise Mobility System (EMS), which will be described below.

In particular, the present disclosure provides a method for displaying the states of group users which are registered, and utilizing the states for supplementary functions such as a call transfer function and a call reservation function in cooperation with an IP-PBX, a scheduler server, an AP (Access Point)/APC (Access Point Controller) in order to provide a presence function provided by a smart phone or an IP phone (or an Internet phone) in an enterprise mobility system.

Figure 1:
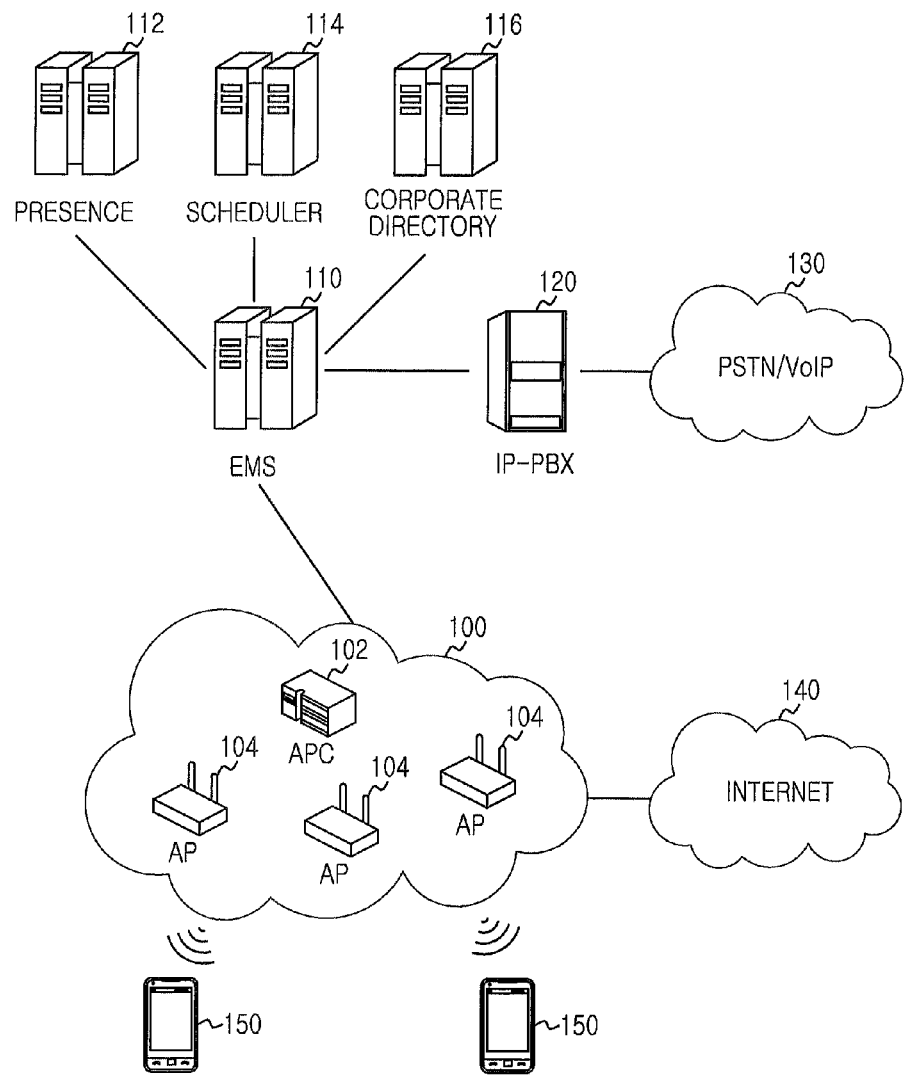
FIG. 1 illustrates a configuration of an Element Management System (EMS) network according to the present disclosure.

FIG. 1 illustrates a configuration of an Element Management System (EMS) network according to the present disclosure.

Referring to FIG. 1, the EMS network includes a wireless access network 100, an EMS server 110, a presence server 112, a scheduler server 114, a corporate directory server 116, an IP (Internet Protocol)—PBX (Private Branch Exchange) 120. Although not shown in drawings, a variety of networking equipment (for example, security equipment) may be configured additionally between the wireless access network 100 and the EMS server 110.

The wireless access network 100 includes a plurality of Access Points (AP) and an Access Point Controller (ACP). The AP 104 provides a wireless access service to terminals 150 within an enterprise, and the APC 102 is a gateway and controls the plurality of APs 104. Depending on the enterprise's environment, the wireless access network 100 may be implemented by including more APs and a plurality of APCs.

The terminal 150 can access the Internet network 140 through the wireless access network 100 within the enterprise and access a PSTN (Public Switched Telephone Network)/VoIP (Voice over Internet Protocol) network 130 through the IP-PBX 120.

The EMS server 110 manages the subscriber state and registration of the user of a smart phone according to a predetermined procedure. Also, the EMS server 110 collects information related to the state of a registered smart phone from the presence server 112, the scheduler server 114, the corporate directory server 116, and the IP-PBX 120. The presence server 112, the scheduler server 114, and the corporate directory server 116 are installed within the enterprise, and depending on the enterprise's environment, a variety of purposes of servers may be added thereto.

The IP-PBX 120 is an Internet based private exchanger and provides the busy, incoming or idle state information of each user to the EMS server 110 and provides a telephone function and a supplementary function.

The AP 104/APC 102 performs a function of managing wired/wireless routers. For example, the AP 104/APC 102 enables a smart phone to access to the Internet network within the enterprise through WiFi and provides a location to which a corresponding user is connected to the EMS server 110. Depending on implementation, when the location of the AP is fixed, the EMS server 110 may determine the location of the smart phone accessing to the corresponding AP based on the ID of the corresponding AP.

The scheduler server 114 classifies schedule information, such as conference, business trip or the like, among the scheduler of a user into categories and provides the result to the EMS server 110.

The corporate directory server 116 provides employee address book information to the EMS server 110.

The presence server 112 provides state information related to the example embodiment in which internal messengers or the like are utilized to the EMS server 110.

In this example embodiment, differences from an existing presence function is that 1) the location based state information of the IP PBX and the AP/APC is used for presence and 2) displayed state information is used for the telephone and telephone supplementary functions of the IP PBX.

Figure 2:
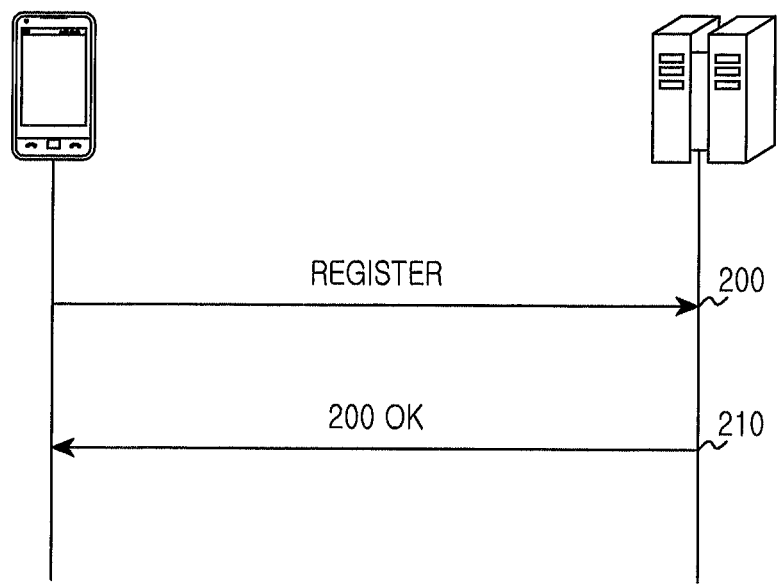
FIG. 2 illustrates a signal process for providing the state information of a user group to a terminal by an EMS server according to an embodiment of the present disclosure.

FIG. 2 illustrates a signal process for providing the state information of a user group to a terminal by an EMS server according to an embodiment of the present disclosure.

Referring to FIG. 2, in step 200, the terminal transmits a registration message to the EMS server. The registration message may be transmitted to the EMS server whenever a user having the terminal enters an enterprise or periodically.

In step 210, the EMS server transmits a 200 OK message including the states of group users associated with the user of the terminal. For example, the state information (busy, incoming or idle state, location, conference, business trip, or the like) of the user group which is collected from the presence server 112, the scheduler server 114, the corporate directory server 116, and the IP-PBX 120 is included in the 200 OK message.

Figure 3:
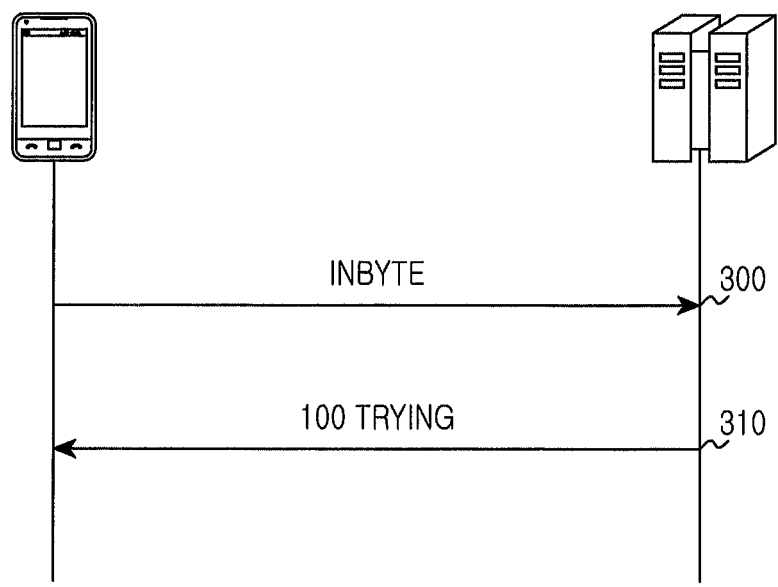
FIG. 3 illustrates a signal process for providing the state information of a user group when a call is originated through a terminal according to an embodiment of the present disclosure.

FIG. 3 illustrates a signal process for providing the state information of a user group when a call is originated through a terminal according to an embodiment of the present disclosure.

Referring to FIG. 3, in step 300, an originating terminal transmits an INVITE message to the EMS server for call connection to a terminating terminal.

In step 310, the EMS server transmits a 100 Trying message including the state information (busy, incoming or idle state, location, conference or business trip or the like) of the terminating terminal, and informing that the INVITE message has been received to the terminating terminal.

Figure 4:
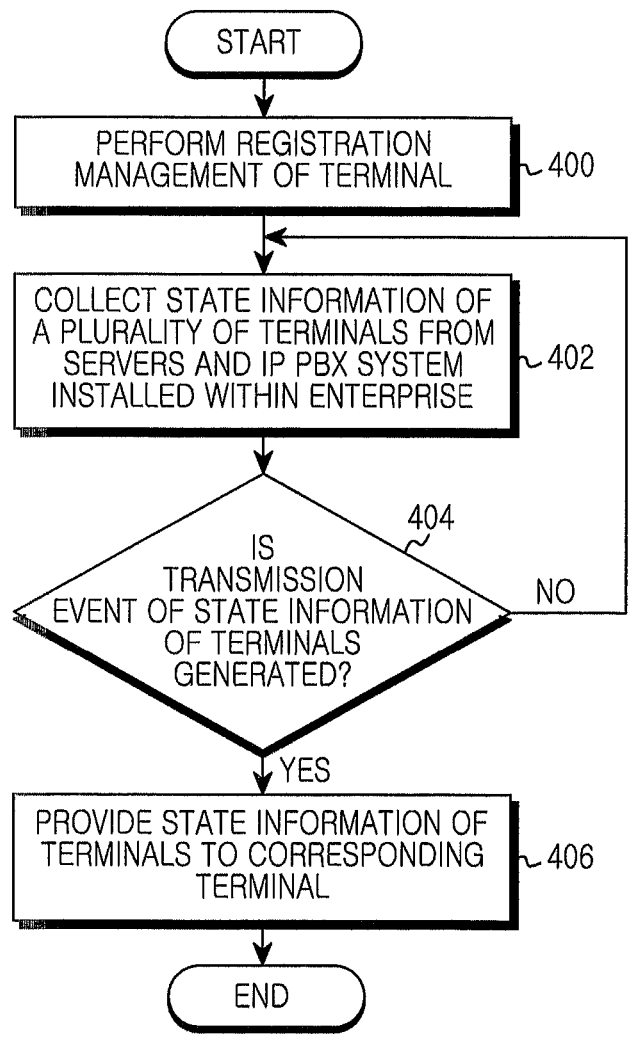
FIG. 4 illustrates a flowchart of an EMS server according to an embodiment of the present disclosure.

FIG. 4 illustrates a flowchart of an EMS server according to an embodiment of the present disclosure.

Referring to FIG. 4, in step 400, the EMS server performs registration management of a terminal.

In step 402, the EMS server collects the state information of a plurality of terminals from a plurality of servers and an IP PBX system, which are installed within an enterprise. For example, the EMS server receives the busy, incoming or idle state information of respective users from the IP-PBX 120, a location to which a corresponding user is connected from the AP 104/APC 102, schedule information, such as conference or business trip, from the scheduler server, employee address book information from the corporate directory server 116, and a corresponding state information from the presence server 112.

In step 404, the EMS server determines whether to transmit the state information of the user group to a corresponding terminal. The transmission event of the state information of the user group is generated when the user enters an enterprise, or when a call establishment is requested. Depending on implementation, the transmission event of the state information of the user group may be generated periodically.

In step 406, the EMS server transmits the state information of the user group to the corresponding terminal. For example, the state information of the corresponding terminal may be one of busy, incoming and idle states, a location, conference and business trip.

Then, the EMS server ends the process of the present disclosure.

Figure 5:
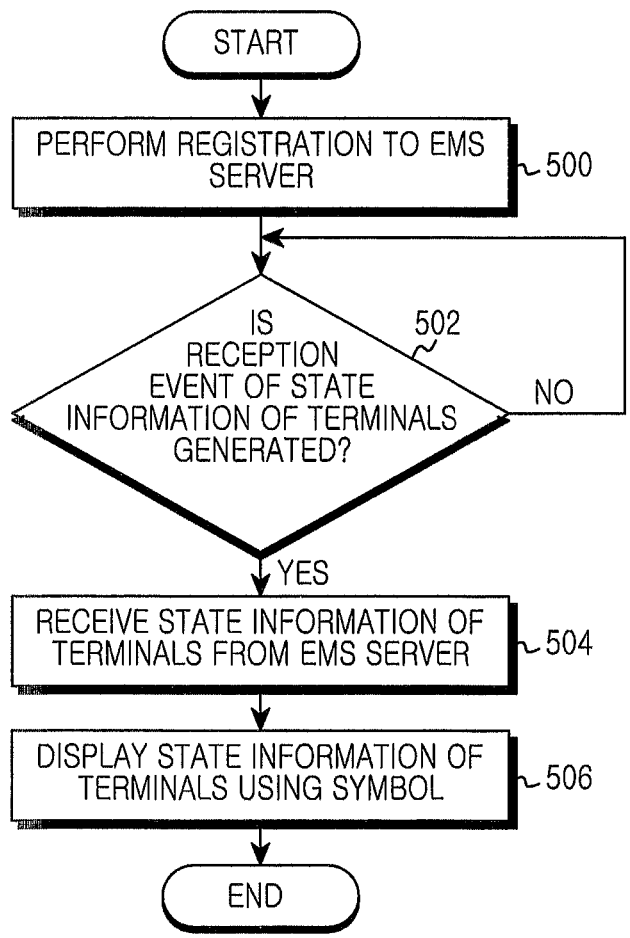
FIG. 5 illustrates a flowchart of a terminal according to an embodiment of the present disclosure.

FIG. 5 illustrates a flowchart of a terminal according to an embodiment of the present disclosure.

Referring to FIG. 5, in step 500, the terminal requests registration from the EMS server and completes the registration.

In step 502, the terminal determines whether to receive the state information of a group user or terminating terminal. When the state information of a group user or terminating terminal is received, the terminal proceeds to step 504. In step 504, the terminal receives the state information of the group user or terminating terminal from the EMS server.

In step 506, the terminal displays the received state information of the group user or terminating terminal using a symbol (for example, icon or emoticon).

Then, the terminal ends the process of the present disclosure.

Figure 6:
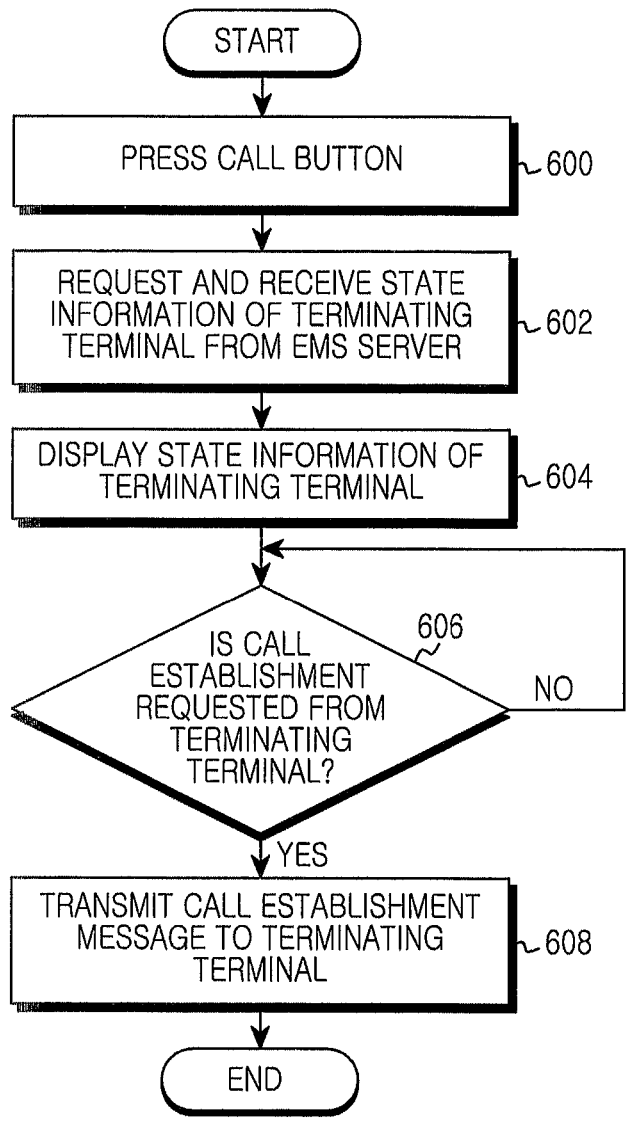
FIG. 6 illustrates a flowchart of a terminal for call connection according to an embodiment of the present disclosure.

FIG. 6 illustrates a flowchart of a terminal for call connection according to an embodiment of the present disclosure.

Referring to FIG. 6, in step 600, a user presses the call button of a terminal in step 600. In step 602, the terminal requests and receives the state information of a terminating terminal from the EMS server. If the state information of the terminating terminal is stored in the terminal, step 602 may be omitted.

In step 604, the terminal displays the received state information of the terminating terminal. For example, the terminal displays a symbol (for example, icon or emoticon) representing the received state information of the group user or terminating terminal along with the identifier of the terminating terminal, or a popup window containing a text that represents the state of the terminating terminal.

In step 606, the terminal determines whether call establishment is requested from the terminating terminal based on the displayed state information of the terminating terminal. Depending on embodiments, a user may check the displayed state information of the terminating terminal and directly determine whether to request call establishment.

In step 608, the terminal transmits a call establishment message to the terminating terminal whether call establishment has been requested from the terminating terminal.

Thereafter, the terminal ends the process of the present disclosure.

Figure 7:
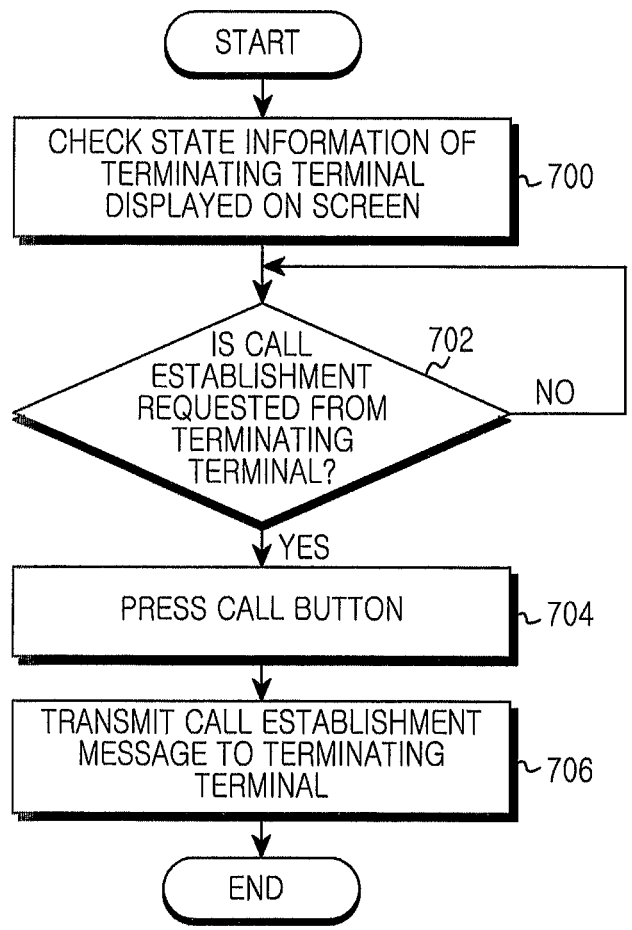
FIG. 7 illustrates a flowchart of a terminal for call connection according to another embodiment of the present disclosure.

FIG. 7 illustrates a flowchart of a terminal for call connection according to another embodiment of the present disclosure.

Referring to FIG. 7, in step 700, the terminal checks the state information of a terminating terminal among the state information of terminals displayed on a screen as in FIG. 9.

In step 702, the terminal determines whether to request call establishment from the terminating terminal. In step 704, the call button of the terminal is pressed when the call establishment has been determined.

In step 706, the terminal transmits a call establishment message to the terminating terminal.

Figure 8:
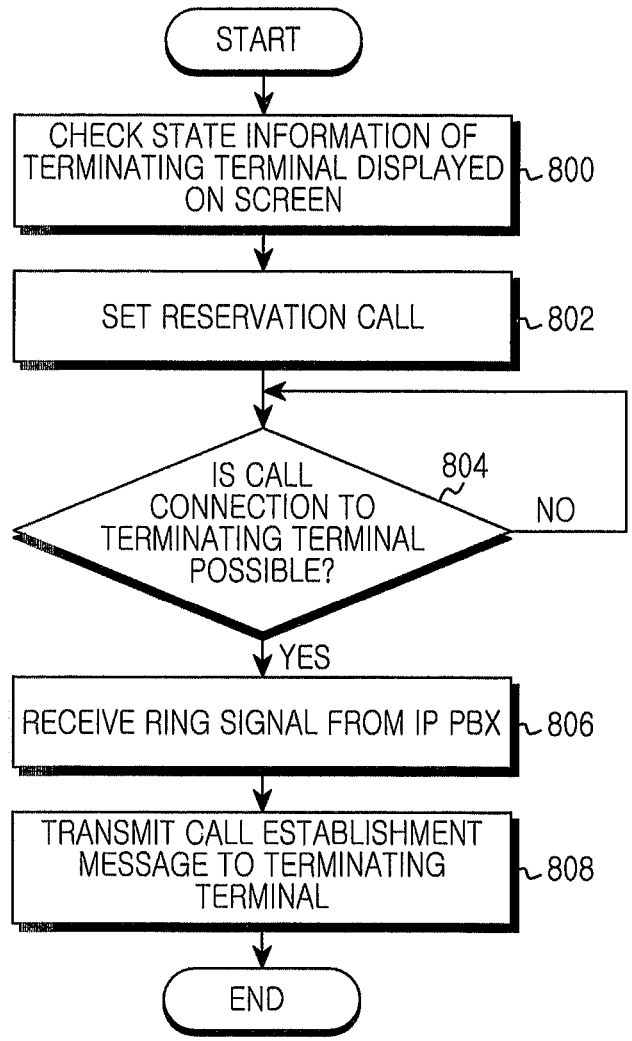
FIG. 8 illustrates a flowchart of a terminal for call connection according to another embodiment of the present disclosure.

FIG. 8 illustrates a flowchart of a terminal for call connection according to another embodiment of the present disclosure.

Referring to FIG. 8, in step 800, the terminal checks the state information of a terminating terminal among the state information of terminals displayed on a screen as in FIG. 9.

In step 802, the terminal sets a reservation call based on the state information of the corresponding terminating terminal.

In step 804, the terminal checks whether call connection to the terminating terminal is currently possible. In step 806, the terminal receives a ring signal informing that call connection to the terminating terminal is currently possible from the IP-PBX.

In step 808, the terminal transmits a call establishment message to the terminating terminal automatically when a response is generated with respect to the ring signal.

Then, the terminal ends the process of the present disclosure.

Figure 9B:
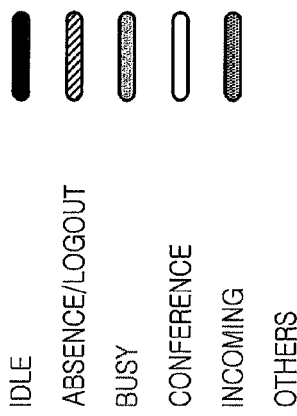
FIGS. 9A and 9B illustrate an example of displaying the state information of group users according to an embodiment of the present disclosure.
Figure 9A:
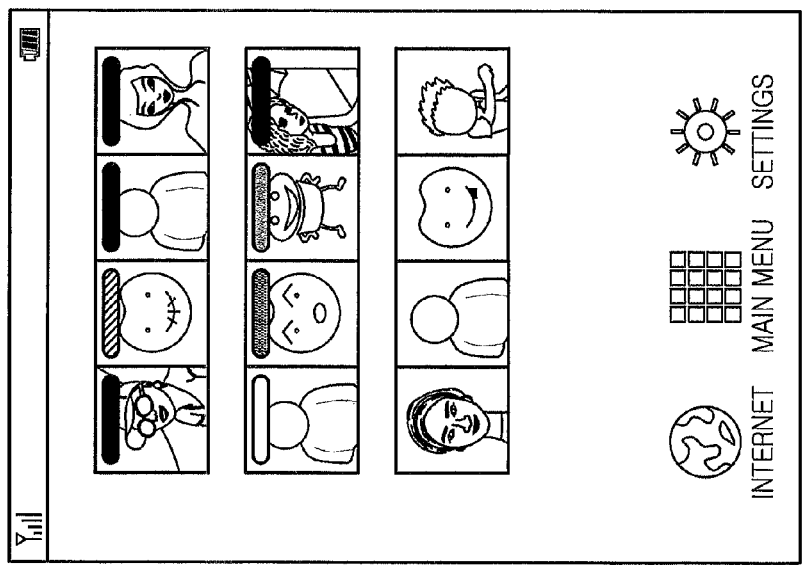

FIGS. 9A and 9B illustrate an example of displaying the state information of group users according to an embodiment of the present disclosure.

Referring to FIGS. 9A and 9B, a state display example in which the states of the group users (12 users) are displayed using a plurality of widgets is illustrated. A user group may be configured automatically based on the addresses of users of corresponding terminals or manually by a user. Depending on embodiments, the EMS server may configure a user group based on information about a department which the user belongs to, and a call history related to the users of other departments.

For example, the state of the user is displayed using a widget on the background screen of a smart phone. As viewed in the screen, the state information of the 12 users of the user group is displayed along with the names and pictures of users. The state information may include idle, absence/log out, busy, conference, incoming, others and the like.

"IDLE" indicates that a user is in an idle state when a user enters the enterprise, automatically accesses to the AP (WiFi) and logins to the EMS server. "LOGOUT" indicates that a user is in a punch out state when the user goes out the enterprise, gets out the WiFi network within the enterprise and logouts from the EMS server. "CONFERENCE" indicates that the user is in conference when the scheduler represents that the user is in conference, or the user is currently connected to a conference room through the APC the APC. "BUSY/INCOMING" is displayed when a related state is received from the IP-PBX.

In this example embodiment, in order to decrease traffic of user state display data, upon registration to the EMS server, state data may be provided to the terminal in response to the registration. In another example, a refresh function may be provided in order for a user to view a current state in a server.

On the other hand, in the screen of FIG. 9, whether a function, such as call dialing, message, texting, a call pick up function, a call reservation function, or the like is performed may be displayed when icons for state display are clicked. The call pick up function is a function for enabling the user to receive a call which is received through the other user of the group users using the user's own telephone.

Figure 10B:
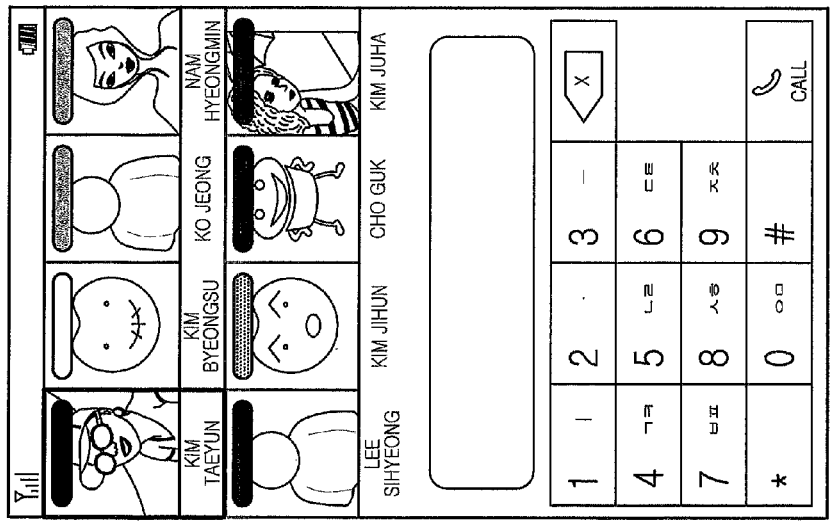
FIGS. 10A and 10B illustrate an example of a call state according to an embodiment of the present disclosure.
Figure 10A:
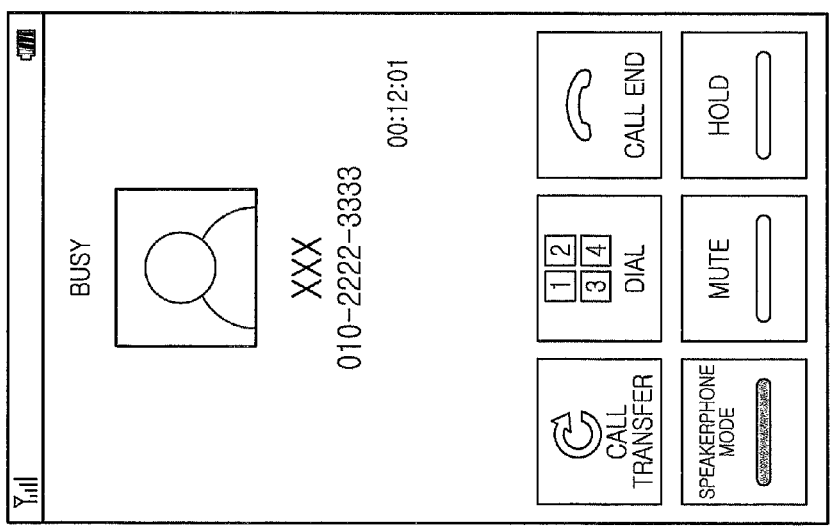

FIGS. 10A and 10B illustrate an example of a call state according to an embodiment of the present disclosure.

Referring to FIGS. 10A and 10B, a call transfer function in that a call connected to a terminating terminal is transferred to a third party is displayed as an example, which is expansion of call dialing/receiving functions using state information.

In a state in which call connection is currently set between two terminals, when a call transfer button is selected in any one of the two terminals (FIG. 10A), a corresponding user selects "a state information window" and checks the state of the third party to which the call is transferred (FIG. 10B). As a result, the corresponding user may check the state of the third party and transfer the currently connected call to the third party.

Figure 11:
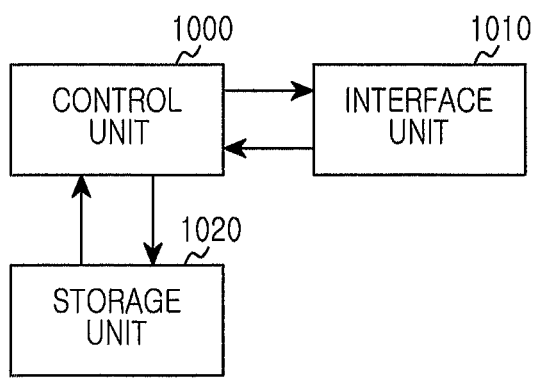
FIG. 11 illustrates an EMS server device according an embodiment of the present disclosure.

FIG. 11 illustrates an EMS server device according an embodiment of the present disclosure.

Referring to FIG. 11, the EMS server includes a control unit 1000 or processor, an interface unit 1010, and a storage unit 1020.

The control unit 1000 or processor of the EMS server 110 manages the subscriber state and registration of the user of a smart phone according to a predetermined process.

For example, the control unit 1000 or processor collects the state information of a plurality of terminals from a plurality of servers and an IP PBX system installed within an enterprise, determines whether to transmit the state information of a user group to a corresponding terminal and transmits the state information of the user group to the corresponding terminal through the interface unit 1010.

The interface unit 1010 provides an interface for transmitting and receiving data to and from the plurality of servers, the IP-PBX and a wireless access network.

The storage unit 1020 stores the state information of corresponding terminals provided from the plurality of servers, the IP-PBX and the wireless access network.

Figure 12:
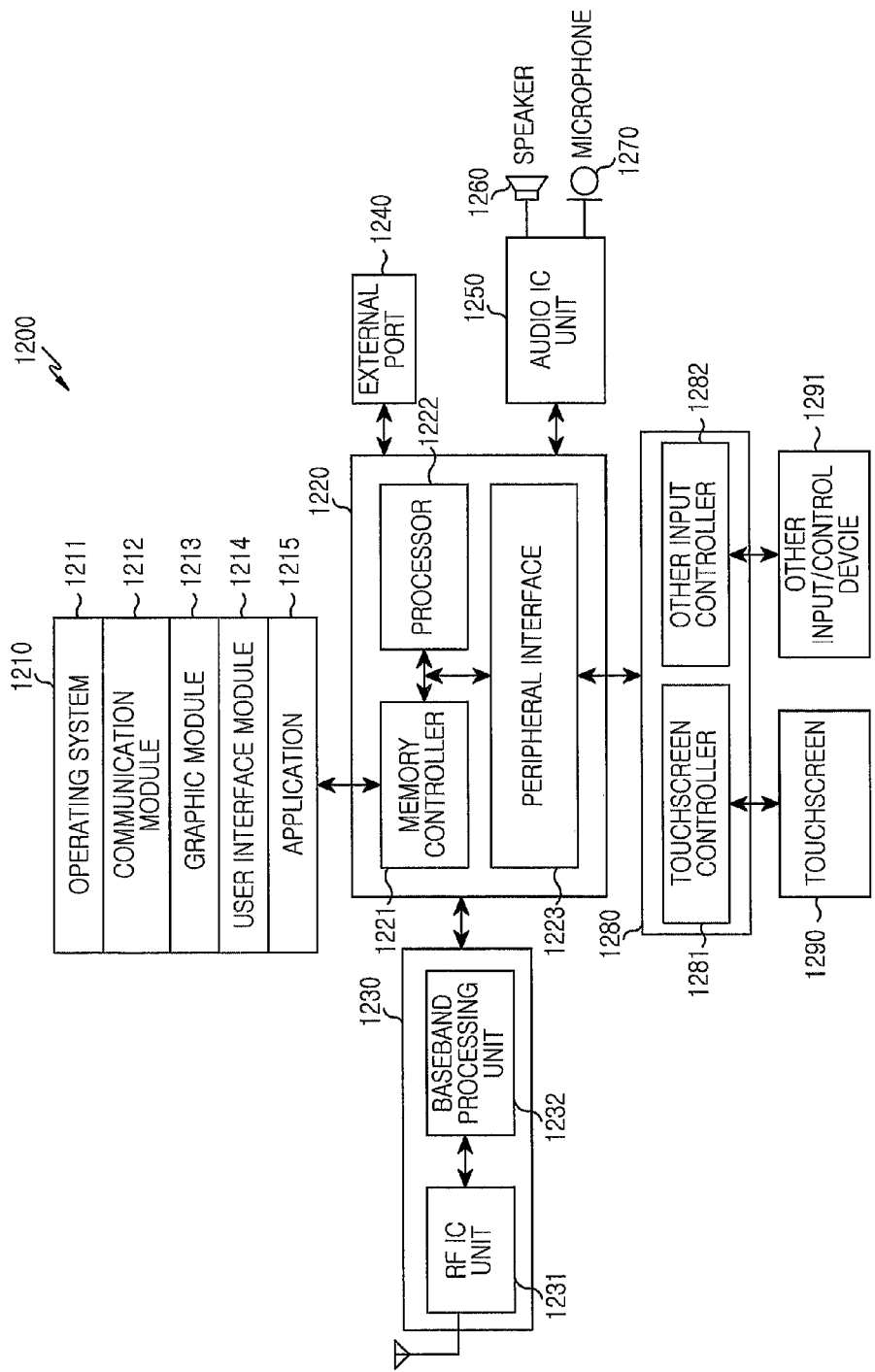
FIG. 12 illustrates a portable electronic device according to an embodiment of the present disclosure.

FIG. 12 illustrates a portable electronic device according to an embodiment of the present disclosure.

The portable electronic device 1200 according to the present disclosure may be portable terminals, mobile phones, mobile pads, media players, tablet computers, handheld computers, personal digital assistants (PDAs), and the like. Also, the portable electronic device may be any portable electronic device including a combination of two or more functions of the above-mentioned devices.

The portable electronic device 1200 includes a memory 1210, a processor unit 1220, a communication system 1230, an external port 1240, an audio IC (Integrated Circuit) unit 1250, a speaker 1260, a microphone 1270, an input/output (10) system 1280, a touchscreen 1290, and other input/control devices 1291. The memory unit 1210 and the external port 1240 may be provided in plurality.

In this example embodiment, the processor unit 1220 includes a memory controller 1221, a processor (also referred as a Central Processing Unit (CPU)) 1222, and a peripheral interface 1223. In this example embodiment, the processor may be provided in plurality. The communication unit 1230 includes a baseband processor 1232 and a Radio Frequency Integrated Circuit (RF IC) unit 1231. The input/output system 1280 includes a touchscreen controller 1281 and another input controller 1282.

Also, such respective components communicate with each other through one or more communication buses or signal lines (reference numbers not given).

The function of such a component may be implemented using hardware, such as one or more integrated circuit or software or the combination of hardware and software.

The portable electronic device 1200 illustrated in FIG. 12 is merely an example, and therefore, may include more components or less components than what is illustrated. In addition, the portable electronic device 1200 may be configured differently from what is illustrated.

Details of respective components will be described below.

The memory 1210 may include random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the memory may be configured by a combination of some or all of such storage devices. Also, each of the memories may be provided in plurality.

Also, the memory may include an attachable storage device, as a memory, that can be accessed by the electronic device through a communication network such as Internet, Intranet, local area network (LAN), wireless LAN (WLAN), or storage area network (SAN), or through a communication network configured by a combination thereof. This storage device may be accessed by the electronic device through an external port. Also, a separate storage device on a communication network may be accessed by the portable electronic device through the RF IC unit 1231.

The memory 1210 stores software. Components of the software include an operating system (OS) software module 1211, a communication software module 1212, a graphic software module 1213, a user interface (UI) software module 1214, and at least one application software module 1215. In the following description, the software module may be referred to as an instruction set.

The OS software module 1211 (e.g., WINDOWS, LINUX, Darwin, RTXC, UNIX, OS X, or an embedded OS such as VxWorks) includes various software elements for controlling general system operations. Such general system operation controls include, for example, memory control/management, storage hardware (device) control/management, and power control/management. The OS module 111 is configured to enable smooth communication between various hardware elements (devices) and software elements (modules).

The communication software module 1212 includes various software components for processing data transmitted and received through the RF IC unit 1231 or the external port 1240.

The graphic module 1213 includes various software components for providing and displaying graphics on the touchscreen 1290. The graphics include texts, web pages, icons, digital images, videos, and animations.

The UI module 1214 includes various software components related to a user interface. Specifically, the UI module 1214 includes information about how the state of a user interface changes and/or information about under what condition the state of a user interface changes.

The application software module 1215 includes a browser application, an e-mail application, an instant message application, a word processing application, a keyboard emulation application, an address book application, a touch list application, a widget application, a JAVA enable application, a coding application, a digital right management (DRM) application, a voice recognition application, a voice replication application, a position determining function application, a location-based service (LBS) application, a music player application, and the like.

Control is performed by the memory controller 1221 in a example embodiment where the processor 1222 included in the processor unit 1220 or another component, such as the peripheral interface 1223, accesses the memory 1210.

The external port 1240 may be, for example, a universal serial bus (USB) port or a FireWire port, but is not limited thereto. The external port 1240 is used for connection to other electronic device directly or indirectly through a network (for example, Internet, intranet, or wireless LAN).

The peripheral interface 1223 connects the input/output peripheral of the portable electronic device 1200 to the processor 1222 and the memory 1210 (under the control of the memory controller). The portable electronic device 1222 may include a plurality of processors 1222. The processor 1222 performs various functions for the portable electronic device 1200 using a variety of software programs, and also performs processes and controls for voice communication and data communication. In addition to the general functions, the processor 1222 runs a specific software module (an instruction set) stored in the memory 1210 to perform specific various functions corresponding to the module.

For example, the processor 1222 executes instruction sets for performing the operations of the flowcharts illustrated in FIGS. 5 to 8.

The processor 1222, the peripheral interface 1223 and the memory controller 1221 may be implemented with single chip. In this example embodiment, the single chip configuration is referred to as the processor unit 1220. Also, those components may be implemented in separate chips rather than single chip.

The communication unit 1230 includes a Radio Frequency (RF) IC unit 1231 and a baseband processing unit 1232. The RF IC unit 1231 transmits and receives electromagnetic waves. The RF IC unit 1231 converts baseband signals from the baseband processing unit 1232 into electromagnetic waves and transmits the electromagnetic waves through an antenna (a reference number is not given). Also, the RF IC unit 1231 converts electromagnetic waves received through an antenna into baseband signals and provides the baseband signals to the baseband processing unit 1232. The RF IC unit 1231 includes a RF transceiver, an amplifier, a tuner, an oscillator, a digital signal processor, a CODEC (COding DECoding) chip set, a Subscriber Identity Module (SIM) card and the like.

The RF IC unit 1231 communicates with a communication network and other communication devices through electromagnetic waves. For example, the RF IC unit 1231 communicates with a wireless network, such as Internet, Intranet, network, cellular telephone network, wireless LAN (WLAN), or Metropolitan Area Network (MAN), and also may communicate with other electronic devices through wireless communication.

Wireless communication may be performed using a TDMA (time division multiple access) network, a GSM (Global System for Mobile Communication) network, an EDGE (Enhanced Data GSM Environment) network, a CDMA (Code Division Multiple Access) network, a W-CDMA (W-Code Division Multiple Access) network, a Bluetooth network, a VoIP (voice over Internet Protocol) protocol, a WiFi (Wireless Fidelity) network, a WiMax network, a protocol for email, instant messaging, a short message service, or any combination of those communication schemes.

In an embodiment, the RF IC unit performs frequency conversion on RF signals received through the antenna (reference number is not given) to provide the conversion result to the baseband processing unit 1232, and performs frequency conversion on baseband signals from the baseband processing unit 1232 to transmit the conversion result to the antenna. The baseband processing unit 1232 processes baseband signals. For example, in the CDMA (Code Division Multiple Access) communication, the baseband processing unit 1232 performs channel coding and spreading on data to be transmitted upon transmission, and performs de-spreading and channel decoding on received signals upon reception.

The audio IC unit 1250 communicates with the user through the speaker 1260 and the microphone 1270. That is, the audio IC unit 1250 provides an audio interface between the user and the portable electronic device 1200 in cooperation with the speaker 1260 and the microphone 1270. The audio IC unit 1250 receives a data signal through the peripheral interface 1223 of the processor unit 1220 and converts the received data signal into an electric signal. The electric signal is transmitted to the speaker 1260. The speaker 1260 converts the electric signal into sound waves audible by humans and outputs the same. The microphone 1216 converts sound waves received from humans or other sound sources into an electric signal. The audio IC unit 1250 receives an electric signal converted by the microphone 1252. The audio IC unit 1250 converts the received electric signal into an audio data signal and transmits the audio data signal to the peripheral interface 1223. The audio data may be transmitted to the memory 1210 or the communication unit 1230 through the peripheral interface 1223. The audio IC unit 1250 may include an attachable/detachable earphone, a headphone, or a headset and a jack (not shown) for providing an interface therebetween. The headset may support output (headphone for single-ear or both-ears) and input (microphone). The jack may be referred to as an earphone jack or a headset jack.

The I/O system 1280 provides an interface between an input/output device, such as the touchscreen controller 1290 or the other input/control device 1291, and the peripheral interface 1223. The I/O system includes the other input controller 1282 for the other input or control devices, which is different from the touchscreen controller 1281. The input controller 1282 may be provided in plurality, and transmits and receives electronic signals to and from the other input/control device 1291. The other input/control device 1291 may include a button, a dial, a stick, a switch and the like.

The touchscreen 1290 provides an I/O interface between the portable electronic device 1200 and the user. That is, the touchscreen 1290 transmits a user touch input to the portable electronic device 1200. Also, the touchscreen 1280 is a medium that displays an output from the portable electronic device 1200 to the user. That is, the touchscreen 1290 displays a visual output to the user. The visual output may be represented by a text, a graphic, a video, or a combination thereof.

The user performs input through the touchscreen 1290 according to haptic contact, tactile contact, or a combination method thereof. The touchscreen 1290 has a touch-sensitive surface that accepts user input. For example, a point of contact between the touchscreen 1290 and the user corresponds to the width of the user's digit used for contact. Also, the user can contact with the touchscreen 1290 using any suitable object, such as a stylus pen. When the user performs input through the touchscreen, the touchscreen 1290 detects contact on the touchscreen 1290 in cooperation with the touchscreen controller 1281 and any associated software modules (instruction set). The touchscreen 1290 converts the detected contact into interaction with user-interface objects (for example, soft keys) that are displayed on the touch screen.

The touchscreen 1290 may be implemented using various display technologies, for example, but is not limited thereto, an LCD (liquid crystal display), an LED (Light Emitting Diode), an LPD (light emitting polymer display), or an OLED (Organic Light Emitting Diode). Also, the touchscreen 1290 and the touchscreen controller 1281 may detect the start point, movement, and stop of a touch using various touch detection technologies including a proximity sensor array or other elements, as well as capacitive, resistive, infrared and surface acoustic wave technologies. Also, for this purpose, a proximity sensor array technology or any other technology for determining a contact point on a touchscreen may be used. Also, a touch-sensitive tablet for detecting only touch input without displaying a visual output may be usable.

In addition, the portable electronic device 1200 may include a touch pen (not shown) for activating and deactivating a specific function besides the touchscreen. The touch pad may detect only touch input without displaying a visual output differently from the touchscreen. The touch pad may have another touch-sensitive surface that is separated from that of the touchscreen 1290, or may be formed on an extended part of the touch-sensitive surface formed on the touch screen 1290.

A contact on the touchscreen 1290 is detected by operation of the touchscreen controller 1281 and contact detection software. The touchscreen controller 1281 transmits and receives electronic signals to and from the touchscreen 1290. The contact detection software is stored in the memory 1210 as a contact detection software module (not shown). The contact detection software module includes various software components for determining operations related to the contact on the touchscreen 1290. The software components perform determinations on whether a contact occurs on the touchscreen, contact movement, a contact movement direction, movement time, contact stop. The determination on contact movement may include the determination of a contact movement speed (including a magnitude, or/and a direction) or/and an acceleration (including a magnitude, or/and a direction).

In addition, in the portable electronic device 1200, input may be performed through the motion of the user that is made on the upper portion of the touchscreen 1290. The motion is detected by operations of the touchscreen controller 1281 and motion detection software. The touchscreen controller 1281 transmits and receives electronic signals to and from the touchscreen 1290. The motion detection software is stored in the memory 1210 as a motion detection software module (not shown). The motion detection software module includes various software components for determining motions related to the detection of motions on the touchscreen 1290. The software components perform determinations on whether a motion occurs on the touchscreen, motion movement, a motion movement direction, movement time, motion stop. The determination on motion movement may include the determination of a motion movement speed (including a magnitude, or/and a direction) or/and an acceleration (including a magnitude, or/and a direction).

In addition, the portable electronic device 1200 may include a power supply system (not shown) for supplying power to components included in the portable electronic device 1200. The power supply system may includes a power source (AC power supply or battery), a power failure detection circuit a power converter, a power inverter, a charging device or/and a power state display device (a light emitting diode). Also, the portable electronic device may include a power management and control device for performing power generation, management, and distribution functions.

Also, the portable electronic device 1200 may enable various functions which are performed by input through the touchscreen 1290 to be performed by input through the separated touch pad. The function may be performed using a physical input/control device (for example, dial or button). The physical input/control device includes a push button for turning on/off and locking the portable electronic device 1200, a volume control rocker button, a ringer profile, a slide switch for toggling. Also, the portable electronic device may include a function for processing a voice input for activating or deactivating predetermined functions through the microphone 1270.

As described above, there are advantages in that a user can check the state information of group users when entering an enterprise, and expand and use the functions of an existing PBX using the state information.

In addition, it is possible to collect information from an IP PBX, a presence server, a corporate directory, an AP/APC and a scheduler server using an EMS (Enterprise Mobility System), manage the sates of group users, automatically update the user states of the group users without operation by the user of a smart phone, and provide information while reducing and/or maximizing battery consumption.

While the present disclosure has been shown and described with reference to certain exemplary embodiments thereof, it will be understood by those skilled in the art that various changes in form and details may be made therein without departing from the spirit and scope of the present disclosure as defined by the appended claims. Therefore, the scope of the invention is defined not by the detailed description but by the appended claims, and all differences within the scope will be construed as being included in the present disclosure.

What is claimed is:

1. A method to operate a terminal to provide a presence function in an Enterprise Mobility System (EMS), the method comprising:
    determining whether the terminal exists in a service region of the EMS;
    transmitting, by the terminal, a registration message to a server, if the terminal exists in the service region of the EMS; and
    receiving, by the terminal, a response message to the transmitted registration message, the response message including state information of a user group for display, wherein the state information comprises information that is collected and provided to the server from a plurality of network entities included in the EMS, wherein the user group comprises a plurality of users, and wherein the state information is determined based on location information of each of the users of the user group.

2. The method of claim 1, wherein the state information identifies one of: an idle state, an absence state, a logout state, a busy state, a conference state, or an incoming state.

3. The method of claim 1, wherein at least one of the plurality of network entities comprises an internet protocol private branch exchange (IP-PBX).

4. The method of claim 1, wherein the state information is used for at least one of a telephone function or a supplementary function of an interne protocol private branch exchange (IP-PBX).

5. The method of claim 1, further comprising:
    displaying the state information to a user on a background screen in a widget form.

6. A method to operate a server to provide a presence function in an Enterprise Mobility System (EMS), the method comprising:
    receiving state information of a user group associated with a terminal from at least one network entity of a plurality of network entities included in the EMS; and
    in response to receiving a registration message from the terminal, transmitting a response message including the state information of the user group to the terminal, if the terminal exists in the service region of the EMS, wherein the user group comprises a plurality of users, and wherein the state information is determined based on location information of each of the users of the user group.

7. The method of claim 6, wherein the state information identifies one of: an idle state, an absence state, a logout state, a busy state, a conference state, or an incoming state.

8. The method of claim 6, wherein at least one of the plurality of network entities comprises an internet protocol private branch exchange (IP-PBX).

9. The method of claim 6, wherein the state information is used for at least one of a telephone function or a supplementary function of an internet protocol private branch exchange (IP-PBX).

10. The method of claim 6, wherein the state information of the user group is displayed to a user on a background screen in a widget form.

11. An electronic device comprising processing circuitry configured to:
    determining whether the electronic device exists in a service region of an Enterprise Mobility System (EMS);
    transmit a registration message to a server if the electronic device exists in a service region of the EMS; and
    receive, from the server in response to the registration message, a response message including state information of a user group for display, wherein the state information comprises information that is collected and provided to the server from at least one network entity of a plurality of network entities included in the EMS, wherein the user group comprises a plurality of users, and wherein the state information is determined based on location information of each of the users of the user group.

12. The electronic device of claim 11, wherein the state information identifies one of: an idle state, an absence state, a logout state, a busy state, a conference state, or an incoming state.

13. The electronic device of claim 11, wherein at least one of the plurality of network entities comprises an interne protocol private branch exchange (IP-PBX).

14. The electronic device of claim 11, wherein the state information is used for at least one of a telephone function or a supplementary function of an internet protocol private branch exchange (IP-PBX).

15. The electronic device of claim 11, further comprising:
    displaying the state information to a user on a background screen in a widget form.

16. An electronic device comprising processing circuitry configured to:
    receive state information of a user group associated with a terminal from at least one network entity of a plurality of network entities included in an enterprise mobility system (EMS); and
    in response to receiving a registration message from the terminal, transmit a response message including the state information of the user group to the terminal if the terminal exists in a service region of the EMS, wherein the user group comprises a plurality of users, and wherein the state information is determined based on location information of each of the users of the user group.

17. The electronic device of claim 16, wherein the state information identifies one of: an idle state, an absence state, a logout state, a busy state, a conference state, or an incoming state.

18. The electronic device of claim 16, wherein at least one of the plurality of network entities comprises an internet protocol private branch exchange (IP-PBX).

19. The electronic device of claim 16, wherein the state information is used for at least one of a telephone function or a supplementary function of an internet protocol private branch exchange (IP-PBX).

20. The electronic device of claim 16, wherein the state information of the user group is displayed to a user on a background screen in a widget form.

21. A system configured to provide a presence function, the system comprising:
    a server configured to:
        receive state information of a user group associated with a terminal from at least one network entity of a plurality of network entities included in an Enterprise Mobility System (EMS), and
        in response to receiving a registration message from the terminal, transmit a response message including the state information of the user group to the terminal; and
    the terminal configured to:
        determine whether the terminal exists in a service region of the EMS;
        transmit the registration message to the server if the terminal exists in a service region of the EMS; and
        in response to the registration message, receive from the server a response message including state information of a user group for display, wherein the user group comprises a plurality of users, and wherein the state information is determined based on location information of each of the users of the user group.

22. The system of claim 21, wherein the information identifies one of: an idle state, an absence state, a logout state, a busy state, a conference state, or an incoming state.

23. The system of claim 21, wherein:
    the information system includes a plurality of network entities; and
    at least one of the plurality of network entities comprises an internet protocol private branch exchange (IP-PBX).

24. The system of claim 21, wherein the information is used for at least one of a telephone function or a supplementary function of an internet protocol private branch exchange (IP-PBX).

25. The system of claim 21, wherein the information is displayed to a user on a background screen in a widget form.

26. A method to operate a first terminal, the method comprising:
    in response to a call transfer event occurring during a call connection with a second terminal, displaying pre-registered user information of the first terminal and state information of respective users; and
    in response to a selection of a specific user from the user information, initiating a transfer of the call connection to a third terminal associated with the specific user, wherein the state information comprises information that is collected to a server from at least one network entity of a plurality of network entities included in an Enterprise Mobility System (EMS), wherein the user group comprises a plurality of users, and wherein the state information is determined based on location information of each of the users of the user group.

* * * * *